(12) United States Patent
Albe

(10) Patent No.: US 7,413,812 B2
(45) Date of Patent: Aug. 19, 2008

(54) POLYPROPYLENE ARTICLE AND METHOD OF PREPARING POLYPROPYLENE ARTICLE

(75) Inventor: Lisa Albe, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 143 days.

(21) Appl. No.: 11/114,377

(22) Filed: Apr. 26, 2005

(65) Prior Publication Data

US 2006/0251913 A1   Nov. 9, 2006

(51) Int. Cl.
*B28B 21/00* (2006.01)
*B29C 55/00* (2006.01)

(52) U.S. Cl. ............ 428/515; 428/34.6; 428/516; 264/479

(58) Field of Classification Search ........ 428/515, 428/516, 34.6; 264/479
See application file for complete search history.

(56) References Cited

U.S. PATENT DOCUMENTS

| | | | |
|---|---|---|---|
| 3,893,989 A | 7/1975 | Leicht et al. | 260/93.7 |
| 4,113,802 A | 9/1978 | Matteoli et al. | 260/878 B |
| 4,298,718 A | 11/1981 | Mayr et al. | 526/125 |
| 4,544,717 A | 10/1985 | Mayr et al. | 526/125 |
| 4,794,096 A | 12/1988 | Ewen | 502/117 |
| 4,892,851 A | 1/1990 | Ewen et al. | 502/104 |
| 4,975,403 A | 12/1990 | Ewen | 502/113 |
| 5,620,803 A | 4/1997 | Oyama et al. | 428/516 |
| 5,888,636 A * | 3/1999 | Asanuma et al. | 428/213 |
| 5,888,640 A | 3/1999 | Marotta et al. | 428/308.4 |
| 5,981,047 A | 11/1999 | Wilkie | 428/215 |
| 6,106,933 A * | 8/2000 | Nagai et al. | 428/212 |
| 6,113,996 A | 9/2000 | Amon et al. | 428/34.9 |
| 6,268,062 B1 | 7/2001 | DeMeuse | 428/461 |
| 6,303,233 B1 | 10/2001 | Amon et al. | 428/516 |
| 6,322,883 B1 | 11/2001 | Williams | 428/308.4 |
| 6,362,125 B1 | 3/2002 | Shamshoum et al. | 502/152 |
| 6,534,153 B1 | 3/2003 | Chu et al. | 428/195 |
| 6,623,866 B2 | 9/2003 | Migliorini et al. | 428/516 |
| 6,979,495 B2 * | 12/2005 | Keung et al. | 428/476.1 |
| 2002/0155308 A1 * | 10/2002 | Heffelfinger et al. | 428/475.8 |
| 2003/0211350 A1 * | 11/2003 | Migliorini et al. | 428/515 |
| 2005/0100752 A1 * | 5/2005 | Hanyu et al. | 428/516 |

FOREIGN PATENT DOCUMENTS

EP   0284708 A1   10/1988

OTHER PUBLICATIONS

Pitt Supaphol et al.; *Thermal Properties and Isothermal Crystalization of Syndiotactic Polypropylenes: Differential Scanning Calorimetry and Overall Crystallization Kinetics*, Journal of Applied Polymer Science, vol. 75, pp. 444-459 (2000).

* cited by examiner

*Primary Examiner*—Sheeba Ahmed
(74) *Attorney, Agent, or Firm*—Diane L. Kilpatrick-Lee

(57) ABSTRACT

A thermoformed polypropylene article, or sheet for preparing such articles, is formed from a layer of substantially syndiotactic polypropylene and a thin outer layer of substantially isotactic polypropylene that is joined to the layer of syndiotactic polypropylene. At least one of the layers is a non-oriented layer. Two layers of isotactic polypropylene may be used with the layer of syndiotactic polypropylene, so that the syndiotactic polypropylene is sandwiched between the two layers of isotactic polypropylene. The use of the isotactic polypropylene enhances the processability of the syndiotactic polypropylene, which is oftentimes difficult to process because of its lower melting point and slow solidification rate. Because the sheet is comprised predominantly of syndiotactic polypropylene, utilizing only thin outer layers of isotactic polypropylene, it has better transparency and higher impact strength than those conventional articles formed entirely of isotactic polypropylene.

20 Claims, 1 Drawing Sheet

POLYPROPYLENE ARTICLE AND METHOD OF PREPARING POLYPROPYLENE ARTICLE

TECHNICAL FIELD

The invention relates generally to polypropylene and polypropylene copolymers and articles made from such polymers, and in particular, to thermoformed articles and methods of forming such articles using polypropylene and polypropylene copolymers.

BACKGROUND

Polypropylene is most often produced as a stereospecific polymer. Stereospecific polymers are polymers that have a defined arrangement of molecules in space. Both isotactic and syndiotactic propylene polymers, for example, are stereospecific. Isotactic polypropylene is characterized by having all the pendant methyl groups oriented either above or below the polymer chain. Isotactic polypropylene can be illustrated by the following general structural formula:

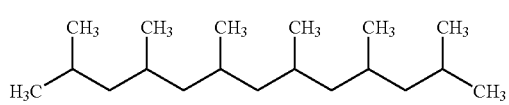

(1)

This structure provides a highly crystalline polymer molecule. Using the Fisher projection formula, the stereochemical sequence of isotactic polypropylene, as shown by Formula (2), is described as follows:

(2)

Another way of describing the structure is through the use of NMR. Bovey's NMR nomenclature for an isotactic pentad is . . . mmmm . . . with each "m" representing a "meso" dyad, or successive methyl groups on the same side of the plane of the polymer chain. As is known in the art, any deviation or inversion in the structure of the chain lowers the degree of isotacticity and crystallinity of the polymer.

In contrast to the isotactic structure, syndiotactic propylene polymers are those in which the methyl groups attached to the tertiary carbon atoms of successive monomeric units in the polymer chain lie on alternate sides of the plane of the polymer. Syndiotactic polypropylene can be illustrated by the following general structural formula:

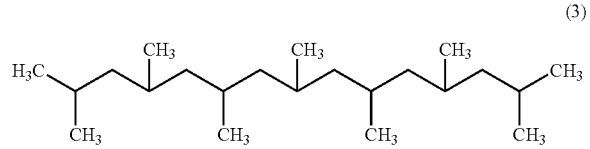

(3)

Using the Fisher projection formula, the structure of syndiotactic polypropylene can be shown as follows:

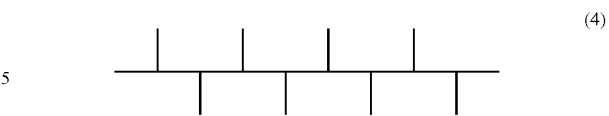

(4)

The corresponding syndiotactic pentad is . . . rrrr . . . , with each "r" representing a "racemic" dyad. Syndiotactic polymers, like the isotactic polymers, are semi-crystalline. This crystallinity distinguishes both syndiotactic and isotactic polymers from an atactic polymer, which is non-crystalline and highly soluble in xylene. An atactic polymer exhibits no regular order of repeating unit configurations in the polymer chain and forms essentially a waxy product.

Although isotactic and syndiotactic polypropylene are both semi-crystalline polymers, they each have different characteristics or properties. Isotactic polypropylene has good processability during extrusion and molding or thermoforming. Isotactic polypropylene has a "hazy" or "cloudy" appearance that is undesirable for some applications. In contrast, syndiotactic polypropylene has excellent transparency or clarity and does not exhibit the haziness or cloudiness associated with isotactic polypropylene. Syndiotactic polypropylene also has good impact characteristics that are in many cases superior to isotactic polypropylene. Syndiotactic polypropylene is difficult to produce in commercially viable sheet form, however, due to its low melting point, slow solidification rate and narrow molecular weight distribution. As a result, the syndiotactic polypropylene is much softer and may exhibit surface tackiness when heated, which is undesirable and makes subsequent molding operations difficult. This is particularly undesirable in thermoforming applications, where clarity and impact strength of the product are important, but where the slow solidification rate and narrow molecular weight distribution of the polymer result in processing difficulties.

What is therefore needed is a polypropylene, particularly for use in thermoforming applications, wherein the polypropylene exhibits those desirable characteristics associated with syndiotactic polypropylene, but where the difficulties in processing and those undesirable characteristics often associated with syndiotactic polypropylene are reduced or eliminated.

SUMMARY

In one embodiment, the invention is a polypropylene article including a layer of substantially syndiotactic polypropylene and at least one layer of substantially isotactic polypropylene joined to the layer of syndiotactic polypropylene layer so that the layers form a sheet, and wherein at least one of the layers is non-oriented.

In another embodiment, the invention is a thermoformed polypropylene article including a layer of substantially syndiotactic polypropylene and at least one layer of substantially isotactic polypropylene joined to the layer of syndiotactic polypropylene layer, At least one of the isotactic polypropylene and syndiotactic polypropylene layers is non-oriented, and the joined layers are thermoformed into a desired shape exhibiting less than 25% shrinkage in any direction.

In still another embodiment, the invention is a method of preparing a polypropylene article, the method including providing a layer of substantially syndiotactic polypropylene; joining at least one layer of substantially isotactic polypropylene to the syndiotactic polypropylene layer; and then thermoforming the layers into a desired shape.

BRIEF DESCRIPTION OF THE DRAWINGS

For a more complete understanding of the present invention, and the advantages thereof, reference is now made to the following descriptions taken in conjunction with the accompanying figures, in which.

DETAILED DESCRIPTION

Figure 1:
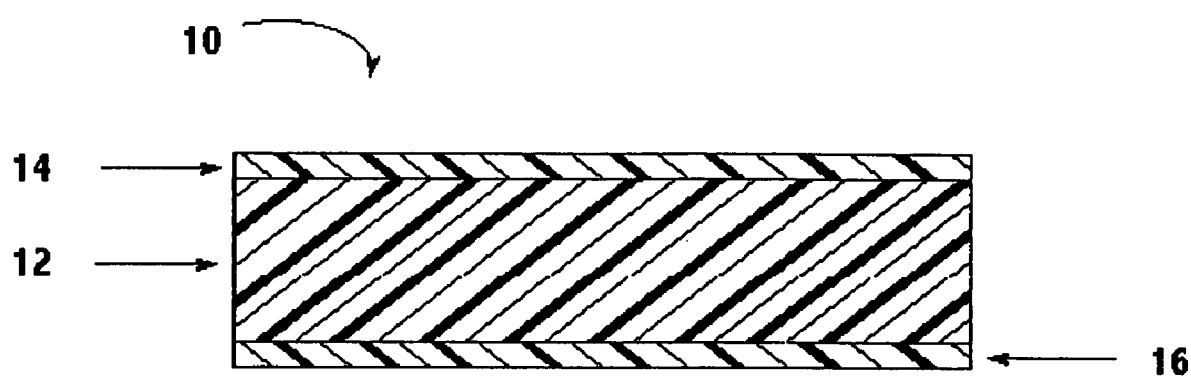
FIG. 1 is a cross-sectional view of a polypropylene sheet constructed in accordance with the invention.

Polypropylene and polypropylene copolymers are used in a variety of different articles and products. As used herein, unless stated otherwise, the term "polypropylene" shall refer to both propylene homopolymers and propylene copolymers. The polypropylene is typically processed into various forms, such as through extrusion molding, injection molding, thermoforming, blow molding, fiber spinning, slit tape, extrusion coating, laminating, or as biaxially oriented film (BOPP). Each of these methods has its own intrinsic operating parameters and processing controls that make the processing of the polypropylene unique with respect to the particular process used.

In the present invention, polypropylene is extruded into a sheet for use in subsequent thermoforming applications. In thermoforming, the polypropylene sheet is pulled, typically by means of pressure from compressed air or by a vacuum, in its solid form into or over a mold under heated conditions. When cooled and removed from the mold, the polypropylene retains the desired shape imparted by the mold.

As has been discussed, syndiotactic polypropylene is quite sticky when heated. During sheet extrusion, sticking to chill rollers can occur, resulting in surface defects on the surface of the sheet. During commercial thermoforming operations, this can be a particular problem because the polypropylene sheet must release cleanly from the conveyor as it is aligned over the mold. Additionally, sticking of the polymer against the sides of the mold may occur during the molding process. This results in the sheet being drawn in or over the mold non-uniformly, producing defects in the thermoformed product. Even momentary sticking can cause defects on the sheet surface, resulting in a rejected part or molded article.

The processability of syndiotactic polypropylene for use in thermoforming applications can be improved, while retaining the transparency and other desired properties associated with such polymers, by combining the syndiotactic polypropylene, as one or more layers, with a cap or outer layer of isotactic polypropylene. Isotactic polypropylene does not exhibit the same degree of softness or stickiness associated with syndiotactic polypropylene when it is heated. It is therefore much easier to process than syndiotactic polypropylene. Moreover, by using relatively thin outer layers of isotactic polypropylene, the hazy quality or cloudiness associated with isotactic polypropylene can be reduced to the extent that it affects the final appearance of the finished product very little, if at all, while the overall clarity or transparency provided by the syndiotactic polypropylene is retained.

While the isotactic and syndiotactic polypropylene used in the present invention are not necessarily limited to polymers produced with a particular catalyst or catalyst type, the syndiotactic polypropylene is usually that produced with a bridged or stereorigid metallocene catalyst system. Metallocene catalysts are well known in the art and consist of a transition metal compound, typically of titanium, zirconium or hafnium, that has two or more cylcopentadienyl (Cp) ligands. In metallocene catalysts used for the preparation of syndiotactic polymers, the Cp ligands are sterically different. Metallocene catalyst systems useful in preparing the syndiotactic polypropylene for use in the present invention include those disclosed and described in U.S. Pat. No. 4,892,851, which is herein incorporated by reference.

Isotactic polypropylene is typically produced utilizing either a Ziegler-Natta catalyst or metallocene catalyst system. Metallocenes useful in the preparation of isotactic polypropylene are the chiral, stereorigid metallocenes. Metallocene catalyst systems used in preparing isotactic polypropylene for use in the present invention include those disclosed and described in European Patent Application No. 87870132.5 (Publication No. 0 284 708 published Oct. 5, 1988), U.S. Pat. Nos. 4,794,096 and 4,975,403, and U.S. patent application Ser. No. 07/911,634, filed Jul. 10, 1992, all of which are herein incorporated by reference.

Ziegler-Natta catalysts, which are also well known in the art, useful in the preparation of isotactic polypropylene are derived from a halide of a transition metal, such as titanium, chromium or vanadium with a metal hydride and/or metal alkyl, typically an organoaluminum compound as a co-catalyst. The catalyst is usually comprised of a titanium halide supported on a magnesium compound. Ziegler-Natta catalysts, such as titanium tetrachloride ($TiCl_4$) supported on an active magnesium dihalide, such as magnesium dichloride or magnesium dibromide, as disclosed, for example, in U.S. Pat. Nos. 4,298,718 and 4,544,717, both to Mayr et al., and which are herein incorporated by reference, are supported catalysts. Silica may also be used as a support. The supported catalyst may be employed in conjunction with a co-catalyst or electron donor such as an alkylaluminum compound, for example, triethylaluminum (TEAL), trimethyl aluminum (TMA) and triisobutyl aluminum (TIBAL).

The polypropylene articles may include an oriented sheet. U.S. Pat. No. 5,620,803, to Oyama, et al., which patent is incorporated herein by reference, discloses preparing an oriented film. The oriented film was made using a double bubble blown film process. The core layer contains 50 wt % to 100 wt % sPP with the remaining 0% to 50% being PP. The PP can be isotactic PP, random copolymer or propylene-ethylene-butene terpolymer. If a copolymer, the reference specifies 2 wt % to 10 wt % ethylene or ethylene and butane. The core layer must be ≧30% of the overall structure thickness.

BOP films are the subject of U.S. Pat. No 6,113,996 to Amon, et al. This reference is incorporated herein by reference and discloses coextruded structures for heat shrinkable BOPP films. The core is an iPP/sPP blend, skins are isotactic polypropylene, atactic polypropylene, polypropylene blended with polybutylene, propylene-butylene copolymers, ethylene-propylene copolymers, polyethylene, and ethylene-propylene-butylene terpolymers. The core has to be >10 wt % sPP, with a recommended 15 to 45 wt % sPP composition. Core contains cavitating agent (polybutylene terephthalate) at low loadings. Other references include U.S. Pat. No. 6,303, 233 which discloses HDPE skin(s) and a nucleator in the core; U.S. Pat. No. 6,322,883 which discloses HDPE skins and a range of crystallization inhibitors/softening materials in the core; U.S. Pat No. 5,888,640 which discloses HDPE or terpolymer skins for metallization and a blend core that can include sPP; U.S. Pat. No. 6,773,818 which discloses a metallized metallocene skin layer and a core layer that can include sPP; all of which are incorporated herein by reference.

Another BOP reference is U.S. Pat. No. 5,981,047 to Wilkie. This reference, incorporated herein by reference discloses that sPP can be used in coextruded BOPP films as a blend component on the skin layer for cold release properties. Blends of ZNiPP and sPP with hydrocarbon resin for BOPP films is disclosed in U.S. Pat. No. 6,268,062 which is incorporated herein by reference.

Unoriented films, also referred to as cast films are disclosed in U.S. Pat. No. 6,534,153 to Chu, et al. This reference discloses that sPP can be used as a skin layer component in such films to produce matte surface finish and is incorporated herein by reference. sPP can be used as a core layer in multilayered oriented film constructions which is disclosed in U.S. Pat. No 6,623,866 which patent is incorporated herein by reference.

Useful copolymers may include those with a single digit melt flow rate. Examples would include Total Petrochemicals 7425, which has a MFR of about 4.0 dg/min, a xylene solubles of about 4.5 wt %, an ethylene content of about 3.0 wt %, and a melting temperature of about 137° C. Another useful copolymer that may be used is Total Petrochemicals 8473, which has a MFR of about 4.6 dg/min, a xylene solubles=5.5 wt %, an ethylene content of about 3.4 wt %, and a melting temp.=134° C. Generally, these polymers will have properties of a MFR of ~4.0 dg/min, a xylene solubles of <5.5 wt, an ethylene level <3.5 wt %, and a melting temperature >135° C.

Useful homopolymers may include those similar to Total Petrochemicals 3371, which has a MFR of about 2.8 dg/min, a xylene solubles about 4.0 wt %, a, melting temp. of about 160° C. and a high crystallinity homopolymer such as Total Petrochemicals 3270, which has a MFR of about 2.0 dg/min, a xylene solubles content of about 1.0 wt %, and a melting temp. of about 164° C.

Another group of polymer that may be useful with the invention includes those PP copolymers that have a low melt flow rate. Examples include, but are not limited to:

1) Total Petrochemicals 6234WZ (MFR=1.5 dg/min, Xylene Solubles=4.0 wt %, Ethylene=2.1 wt %, Melting Temp.=146° C.,;and
2) Total Petrochemicals 7231M Series (MFR=1.5 dg/min, Xylene Solubles=5.5 wt %, Ethylene=2.7 wt %, Melting Temp.=143° C.,);

Heterophasic copolymers (also called impact copolymers or ICPS) may also be useful because of their toughness, stress crack resistance, and impact strength. An example is Total Petrochemicals 4180 (MFR=0.75 dg/min, Homopolymer MFR=1.0 dg/min, Homopolymer Xylene Solubles <2 wt %, ICP Xylene Solubles=14.5 wt %, ICP Total Ethylene=9.2 wt %, Intrinsic Viscosity of Xylene Solubles Fraction (3 dl/g), Ethylene in Xylene Solubles Fraction=39 wt %).

For thermoforming, the useful polymers include those that have melt flow rates <2.0 dg/min. The low melt flow rates may impart to the sheet's free surface good melt strength. Thermoforming grades cover impact copolymers, random copolymers, and homopolymers. Such polymers may be nucleated or clarified to improve optical properties. Exemplary are:

1) Total Petrochemicals 3289MZ (MFR=1.8 dg/min, Xylene Solubles=4.0, Ethylene=None, Melting Temp.=163° C., Clarified with Millad 3988);
2) Total Petrochemicals 6289MZ (MFR=1.5 dg/min, Xylene Solubles=4.0, Ethylene=2.0 wt %, Melting Temp.=150° C., Clarified with Millad 3988); and
3) Total Petrochemicals 4180 (MFR=0.75 dg/min, Homopolymer MFR=1.0 dg/min, Homopolymer Xylene Solubles <2 wt %, ICP Xylene Solubles=14.5 wt %, ICP Total Ethylene=9.2 wt %, Intrinsic Viscosity of Xylene Solubles Fraction (3 dl/g), Ethylene in Xylene Solubles Fraction=39 wt %).

The syndiotactic polypropylene used in the present invention may be a polypropylene homopolymer or polypropylene random copolymer. As used herein, the term "homopolymer" shall mean those polymers having less than about 0.1% by weight of other comonomers. The syndiotactic polypropylene component employed typically has a racemic dyad content, as measured by $^{13}$C-NMR spectra, of at least 75%, and may be at least 90%. Those propylene copolymers typically used in the present invention are those copolymers of olefin monomers having from 2 to 10 carbon atoms, with ethylene being the most common comonomer employed. Typically, the comonomer will make up from about 0.1% to about 10% by weight of polymer, with from about 0.5% to about 6% being typical, and from 1% to about 3% being more typical.

The syndiotactic polypropylene may also include some amount of isotactic polypropylene as a polymer blend. When such blends are employed, typically the amount of isotactic polypropylene will be less than about 50% by weight of the total polymer, with from 0.5 to about 25% being more typical. The polymer blends may be melt blended within an extruder, such as during extrusion of the polymer sheet. Alternatively, the polymer blends may be reactor blended, such as described in U.S. Pat. No. 6,362,125, which is herein incorporated by reference. The melt flow rate or melt flow index (MFI) of the syndiotactic polypropylene will usually be 15 dg/min or less for thermoforming applications, with from about 1 to 5 dg/min being more typical.

The isotactic polypropylene used in the present invention may be a propylene homopolymer, which may be prepared from either Ziegler-Natta or metallocene catalyst useful in preparing istotactic polymers. The isotactic polypropylene component employed will typically have a meso dyad content, as determined by $^{13}$C-NMR spectra, of at least 75%, and may be at least 95%. The isotactic polypropylene may also include some amount of syndiotactic polypropylene as a polymer blend. Where such blends are employed, typically the amount of syndiotactic polypropylene will be less than 50% by total weight of polymer, with from about 0.5% to about 25% being more typical. The polymer blends may be melt blended within an extruder, such as during extrusion of the polymer sheet. Alternatively, the polymer blends may be reactor blended, such as described in U.S. Pat. No. 6,362,125, which is herein incorporated by reference. Typically, the isotactic polypropylene homopolymers useful in the invention are characterized by a melt flow rate of 10 dg/min or less, with a melt flow rate of from about 1 to about 5 being more typical.

The isotactic polypropylene used in the present invention may also include isotactic propylene random copolymers, which may be prepared from either Ziegler-Natta or metallocene catalysts useful in the preparation of isotactic polymers. The isotactic propylene component of the random copolymers employed will typically have a meso dyad content, as determined by $^{13}$C-NMR spectra, of at least 75%, and may be at least 95%. Those copolymers typically used in the present invention are those propylene copolymers of the olefin monomers having from 2 to 10 carbon atoms, with ethylene being the most common comonomer employed. Typically, the comonomer will make up The isotactic and syndiotactic polypropylenes may also contain additives or combinations of additives, which are known to those skilled in the art. These include such things as antioxidants, clarifiers, nucleating agents, colorants, anti-UV agents, antistatic agents, antifog agents, slip agents, antiblock agents, neutralizers, and/or compatibilizers. These additives may be added during the production of the base polymer, and/or during the sheet extrusion process.

As discussed previously, the syndiotactic polypropylene may have a low melting point and narrow molecular weight distribution, which can contribute to processing difficulties in thermoforming applications. The molecular weight distribution or polydispersity index (Mw/Mn) of syndiotactic polypropylene is typically less than 5.5, and usually ranges from 2 to about 4.2. The melting point of syndiotactic polypropylene is usually much lower than that of isotactic polypropylene. Syndiotactic polypropylene typically has a melt point of from 125° C. to about 135° C., while isotactic polypropylene has a melt point of from about 140° C. to about 165° C., depending upon the amount of comonomer incorporated and stereoregularity. When ethylene is used as the comonomer, the higher ethylene content usually results in a lower melting point.

As discussed previously, syndiotactic polypropylene typically has higher clarity or lower haze than isotactic polypropylene. Table 1 below illustrates the difference in haze properties and other properties for different polypropylene injection molded resin samples. A Ziegler-Natta isotactic propylene homopolymer is used for Sample 1. Specifically, Sample 1 is Polypropylene 3289M, available from TOTAL Petrochemicals, Inc. Sample 2 is a clarified Ziegler-Natta-catalyzed isotactic propylene-ethylene random copolymer, available as Polypropylene 6289MZ, from TOTAL Petrochemicals, Inc. Sample 3 is a non-clarified metallocene-catalyzed syndiotactic propylene homopolymer, available as Finaplas™ 1471, from TOTAL Petrochemicals, Inc. Exemplary NMR pentad data is shown in Table 2 for the polymers indicated below the table.

TABLE 1

|  | Sample | | |
| --- | --- | --- | --- |
|  | 1 | 2 | 3 |
| Melt Flow, g/10 min | 1.8 | 1.5 | 4.3 |
| Millad 3988 Clarifier, wt. % | 0.2 | 0.2 | 0 |
| Ethylene Content, wt. % | 0 | 2 | 0 |
| Haze, % | | | |
| 20 mil | 6.2 | 4.9 | 4.6 |
| 40 mil | 19.2 | 11.9 | 9.1 |
| 50 mil | 19.7 | -- | 6.8 |
| 60 mil | 23 | 13.4 | 14.5 |
| 80 mil | 28.3 | 15.3 | 19.1 |
| Notched Izod (ft-lb/in) | 1.1 | -- | 13.3 |
| 2% Flex Modulus (1 × $10^5$ psi) | 1.9 | 1.4 | 0.66 |
| 1% Flex Modulus (1 × $10^5$ psi) | 2.2 | 1.6 | 0.7 |
| 0.4% Flex Modulus (1 × $10^5$ psi) | 2.2 | 1.6 | 0.72 |
| Tensile Modulus (1 × $10^5$ psi) | 2 | 1.6 | 0.65 |
| Tensile Strength at Yield (psi) | 5100 | 4300 | 2200 |
| Elongation at Yield (%) | 14.2 | 17 | 13 |
| Elongation at Yield (%) | 57 | >70 | >300 |

Dashed lines indicate no data measured.

TABLE 2

|  | Sample | | | |
| --- | --- | --- | --- | --- |
|  | 1a | 2a | 3a | 4a |
| Mmmm (mol %) | 0.1 | 96.7 | 97.1 | 89.6 |
| mmmr (mol %) | 0.3 | 1.4 | 0.9 | 3.2 |
| rmmr (mol %) | 2.6 | 0.4 | 0.1 | 0.4 |
| mmrr (mol %) | 4.7 | 1.2 | 0.7 | 2.5 |
| xmrx (mol %) | 3.5 | 0.2 | 0.3 | 1 |
| mrmr (mol %) | 0.7 | 0 | 0 | 0.2 |
| rrrr (mol %) | 76.5 | 0 | 0.3 | 1.2 |
| rrrm (mol %) | 10.6 | 0 | 0.2 | 0.7 |
| mrrm (mol %) | 1 | 0 | 0.4 | 1.2 |
| mole % meso | 7.4 | 99.3 | 98.7 | 95.1 |
| mole % racemic | 92.6 | 0.7 | 1.3 | 4.9 |
| mole % error | 4.3 | 0.5 | 0.3 | 0.9 |
| def/1000 C. | 36.8 | 3.5 | 6.6 | 24.7 |

Sample 1a = Total Petrochemicals 1471, a 4 MFR bimodal sPP
Sample 2a = Total Petrochemicals EOD 01-30m, a 4 MFR metallocene-based homopolymer.
Sample 3a = Total Petrochemicals 3270, a 2 MFR Ziegler-Natta high crystallinity homopolymer.
Sample 4a = Total Petrochemicals 3371, a 2.8 MFR Ziegler-Natta homopolymer.

from about 0.1% to about 10% by weight of polymer, with from about 0.5% to about 6% being typical, and from 1% to about 3% being more typical.

As already stated, the heterophasic impact propylene copolymers may be useful with the invention and are commercially available and are well known within the skill in the art, for instance, as described by E. P. Moore, Jr in Polypropylene Handbook, Hanser Publishers, 1996, page 220-221 and U.S. Pat. Nos. 3,893,989 and 4,113,802. The term "impact propylene copolymer" is used herein to refer to heterophasic propylene copolymers where polypropylene is the continuous phase and an elastomeric phase is dispersed therein. Those of skill in the art recognize that this elastomeric phase may also contain crystalline regions, which for purposes of the current invention are considered part of the elastomeric phase. The impact propylene copolymers result from an in-reactor process rather than physical blending. Usually the impact propylene copolymers are formed in a dual or multi-stage process, which optionally involves a single reactor with at least two process stages taking place therein, or optionally multiple reactors."

The impact propylene copolymers used for the invention have at least about 5 weight percent, preferably at least about 9 weight percent, more preferably at least about 13 weight percent, of an elastomeric phase based on the total weight of the impact propylene copolymer. When the continuous phase of the impact propylene copolymer is a homopolymer propylene polymer and the elastomeric phase is comprised of a copolymer or terpolymer containing monomer units derived from ethylene, the impact propylene copolymer preferably contains at least about 5 weight percent, more preferably at least about 7 weight percent, most preferably at least about 9 weight percent —CH2CH2— units derived from ethylene monomer based on the total weight of the impact propylene copolymer. Preferably, such an impact propylene copolymer contains less than about 30 weight percent, more preferably less than about 25 weight percent, most preferably less than about 20 weight percent —CH2CH2— units derived from ethylene monomer based on the total weight of the impact propylene copolymer."

The isotactic propylene random copolymers and heterophasic copolymers may also include some amount of syndiotactic polypropylene as a polymer blend. Where such blends are employed, typically the amount of syndiotactic polypropylene will be less than 50% by total weight of polymer, with from about 0.5% to about 25% being more typical.

Physical properties for Samples 1-3 are measured using the following testing methods. Haze values are determined according to ASTM D1003. Flexural modulus was measured according to ASTM D790-97. Izod impact strength is measured according to ASTM D256-97. Tensile strength was measured according to ASTM D638-97.

As can be seen, the non-clarified syndiotactic polypropylene has a higher clarity than the clarified propylene homopolymer and propylene-ethylene random copolymer resins at comparable thicknesses. Additionally, syndiotactic polypropylene has a higher impact strength, as measured by Notched Izod. The syndiotactic is less rigid, however, demonstrating a lower flexural modulus.

The differences in set up or solidification rates of the syndiotactic and isotactic polypropylene materials is illustrated below in Table 3. In the Table, s-PP#1 thru s-PP#5 are Total Petrochemicals syndiotactic polypropylene products, and iPP is isotactic polypropylene. The iPP and other polymers are taken from P. Supaphol and J. E. Spruell, "Thermal Properties and Isothermal Crystallization of Syndiotactic Polypropylenes: Differential Scanning Calorimetry and Overall Crystallization Kinetics, *J. Applied Polymer Science*, Vol. 75, 44-59 (2000).

TABLE 3

Kinetic Characteristics of sPP and Some Other Polymers.

| | $T°_m$ (° C.) | $T_g$ (° C.) | $T_{max}$ (° C.) | $(t_{0.5})_{min}$ (sec) | D (° C.) | G (° C. sec$^{-1}$) |
|---|---|---|---|---|---|---|
| s-PP#1 | 146.1 | −6.1 | 60.0 | 95.2 | 36.9 | 0.41 |
| s-PP#2 | 146.6 | −6.0 | 55.0 | 23.7 | 34.7 | 1.56 |
| s-PP#3 | 148.3 | −6.5 | 57.0 | 28.3 | 35.6 | 1.34 |
| s-PP#4 | 146.4 | −5.6 | 56.5 | 45.0 | 35.5 | 0.84 |
| s-PP#5 | 146.4 | −6.5 | 57.0 | 17.7 | 35.6 | 2.14 |
| i-PS[a] | 240 | 100 | 170 | 185 | 40 | 0.16 |
| Nylon 6[a] | 228 | 45 | 146 | 5 | 46 | 6.8 |
| Nylon 66[a] | 264 | 45 | 150 | 0.42 | 80 | 139 |
| i-PP[a] | 180 | −20 | 65 | 1.25 | 60 | 35 |

Tmax = temperature where crystallization rate is at a maximum,
Tm = melting temperature,
Tg = glass transition temperature,
$(t_{0.5})_{min}$ = crystallization half time at Tmax,
D = half width of the crystallization rate, and
G = kinetic crystallizability.

FIG. 1

Referring to FIG. 1, a polypropylene sheet 10 constructed in accordance with the present invention is shown. The sheet 10 may be that used for thermoforming applications and utilizes a layer 12 of syndiotactic polypropylene discussed above, which is typically from about 10 to about 100 mils in thickness. The thickness of the layer 12, as well as the overall thickness of the sheet 10, may vary, however, depending upon the required wall thickness for the molded or thermoformed article. Additionally, the sheet 10 may constitute a film having an overall thickness of less than 10 mils. At least one layer 14 of isotactic polypropylene, as discussed above, is joined to one side of the layer 12 to form an outer layer of the sheet 10. Desirably, a second layer 16 of isotactic polypropylene is joined to the opposite side of the layer 12 so that the syndiotactic is "sandwiched" between the isotactic layers 14, 16, forming a core of the polypropylene sheet 10. In some instances it may be desirable to have alternating layers of isotactic polypropylene and syndiotactic polypropylene in a multilayer sheet, wherein isotactic polypropylene layers constitute one or more inner layers. Desirably, each of the isotactic layers 14, 16 has a thickness that is substantially less than the thickness of the inner syndiotactic layer 12. Typically, the isotactic layer will have a thickness of less than 1/5 that of the syndiotactic layer, with 1/20 to 1/10 being desired. The outer isotactic layer(s) is/are kept relatively thin so that any haziness or cloudiness associated with the isotactic polypropylene material is reduced. Desirably, the thickness is such that any haziness is relatively unnoticeable or of only nominal effect to the overall appearance of polypropylene sheet, so that it has low haze or is substantially haze free.

The syndiotactic layer is joined to the isotactic layers by laminating the layers together. Desirably, the layers are laminated by co-extrusion of the layers into a single sheet. An example of a suitable commercially available extruder for this purpose is the Welex co-extrusion line with a 3½ inch main extruder. Extruder temperatures are usually kept around 350° F. to 600° F. The die exit temperature of the extruder is usually around 380 to 500° F. Upon extrusion, the laminated sheet is cooled, usually by means of chill rollers and may later be cut into desired lengths. Typical line speeds are anywhere from <20 to 200 ft/min, with 20 to 60 ft/min being most common. If only one layer of isotactic polypropylene is used, it may be desirable that the sheet be positioned or oriented so that the isotactic layer faces or contacts the chill rolls to alleviate sticking onto the chill rolls. For rigid thermoformed articles, the extruded sheet should have a thickness sufficient to provide sufficient rigidity to allow the sheet to retain its shape upon thermoforming.

The sheet or at least one of the layers forming the sheet may be a non-oriented sheet or layer. As used herein, the expression "non-oriented" means that the sheet or layer undergoes no or very little stretching or orientation in any direction other than may occur as a result of the normal feeding or conveyance of the layers or sheets through the process equipment during processing. This is in contrast to the intentional stretching of the sheet or film as might occur in producing oriented films, such as biaxially oriented or stretched films. If the sheet or a layer forming the sheet is oriented, it is usually oriented in the machine direction. An orientation ratio of less than 2:1 may be used.

The polypropylene sheet or sheets thus formed can be further processed by means of thermoforming into desired shaped articles. The sheet may also be formed into nonrigid articles as well, such as nonrigid packaging.

In thermoforming, the sheet or sheets are heated to a forming temperature where the sheet material softens, but does not reach a molten or generally liquefied state. Typically, the forming temperatures will range from about 130 to about 195° C. (Note: these are oven temperatures), so that the sheet is softened and can be easily molded. The molds used may also be heated to an elevated temperature, typically from about 80 to about 125° C. If only one layer of isotactic polypropylene is used, it may be desirable during the molding process that the sheet be positioned so that the isotactic layer contacts the mold surface. The sheets are usually fed into the molding apparatus by means of a conveyor system, where the sheet is drawn, pushed or pulled over the mold by means of pressurized air or vacuum, with the aid of a plug. The molded sheet is then cooled and the excess material is trimmed to provide the desired thermoformed molded article(s). The molded sheet will typically exhibit less than 25% shrinkage in any direction after molding, with less than 20%, 15% and 10% shrinkage being achievable.

Examples of articles that may be produced include a wide variety of containers, bubble trays, thin-walled food and deli containers, microwavable containers, drink cups, storage containers, food trays, meat packaging trays, pill bottles, syringes, and automotive parts.

Because isotactic polypropylene is used as thin outer layers, the benefits associated with isotactic polypropylene, i.e. easier processability, are combined with those of syndiotactic polypropylene. This results in a thermoformed article having good transparency and higher impact strength from those formed from conventional isotactic polypropylene. Because the syndiotactic core or inner layer will seldom, if ever, contact the chill rolls or mold surface or other processing or handling equipment, the problems associated with sheet extrusion and thermoforming of syndiotactic polypropylene can be avoided or eliminated. The isotactic polypropylene can also provide a certain amount of structural rigidity during the extrusion and molding processes, which can reduce or eliminate sagging that can cause variations or non-uniform wall thicknesses. Because the sheet is predominantly syndiotactic polypropylene, utilizing only thin outer layers of isotactic polypropylene, it generally retains the transparency and impact strength associated with articles formed completely or entirely from syndiotactic polypropylene.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

What is claimed is:

1. A polypropylene article comprising a layer of substantially syndiotactic polypropylene having a melting point of from about 125° C. to 135° C. and comprising a polypropylene homopolymer or a copolymer of propylene and an olefin monomer of from 2 to 10 carbon atoms, and at least one layer of substantially isotactic polypropylene comprising a polypropylene homopolymer or a copolymer of propylene and an olefin monomer of from 2 to 10 carbon atoms joined to the layer of syndiotactic polypropylene layer so that the layers form a sheet having a haze at a thickness of 20 mils of from 4.6% to 6.2% and a notched Izod of from greater than 1.1 ft-lb/in. to less than 13.3 ft-lb/in, and wherein at least one of the layers is non-oriented.

2. The polypropylene article of claim 1, wherein the layer of syndiotactic polypropylene and the layer of isotactic polypropylene are coextruded.

3. The polypropylene article of claim 1, wherein the isotactic polypropylene has a melting point of from about 140° C. to about 165° C.

4. The polypropylene article of claim 1, wherein the at least one layer of isotactic polypropylene has a thickness that is ⅕ or less than that of the syndiotactic polypropylene.

5. The polypropylene article of claim 1, wherein the layer of syndiotactic polypropylene is from about 10 mils to about 100 mils in thickness; and the layer of isotactic polypropylene is from about 1 to about 10 mils in thickness.

6. The polypropylene article of claim 1, wherein there are at least two layers of substantially isotactic polypropylene joined to the layer of syndiotactic polypropylene with the syndiotactic layer being sandwiched between the at least two layers of isotactic polypropylene.

7. The polypropylene article of claim 1, wherein the polypropylene of at least one of the isotactic and syndiotactic layers is a copolymer of propylene and an olefin monomer of from 2 to 10 carbon atoms, and wherein the olefin monomer is present in an amount of from 0.1% to about 10% by weight of copolymer.

8. The polypropylene article of claim 1, wherein the sheet has less than 25% shrinkage in any direction.

9. The polypropylene article of claim 1, wherein the isotactic polypropylene has a meso pentad content of at least 80% as determined by $^{13}$C-NMR spectra.

10. The polypropylene article of claim 1, wherein the syndiotactic polypropylene has a racemic pentad content of at least 70% as determined by $^{13}$C-NMR spectra.

11. A thermoformed polypropylene article comprising a layer of substantially syndiotactic polypropylene having a melting point of from about 125° C. to 135° C. and comprising a polypropylene homopolymer or a copolymer of propylene and an olefin monomer of from 2 to 10 carbon atoms, and at least one layer of substantially isotactic polypropylene comprising a polypropylene homopolymer or a copolymer of propylene and an olefin monomer of from 2 to 10 carbon atoms joined to the layer of syndiotactic polypropylene layer so that the layers form a sheet having a haze at a thickness of 20 mils of from 4.6% to 6.2% and a notched Izod of from greater than 1.1 ft-lb/in. to less than 13.3 ft-lb/in, and wherein at least one of the isotactic polypropylene and syndiotactic polypropylene layers being non-oriented, the joined layers being thermoformed into a desired shape exhibiting less than 25% shrinkage in any direction.

12. The thermoformed polypropylene article of claim 11, wherein the article is a container, bubble tray, thin-walled food container, thin walled deli container, microwavable contained; drink cup, storage container, food tray, meat packaging tray, pill bottle, syringe, or automotive part.

13. The thermoformed polypropylene article of claim 11, wherein the layer of syndiotactic polypropylene and the layer of isotactic polypropylene are coextruded to form said sheet prior to thermoforming.

14. The thermoformed polypropylene article of claim 11, wherein the layer of syndiotactic polypropylene is from about 10 mils to about 100 mils in thickness; and the layer of isotactic polypropylene is from about 1 to about 10 mils in thickness.

15. The thermoformed polypropylene article of claim 11, wherein there are at least two layers of substantially isotactic polypropylene joined to the layer of syndiotactic polypropylene with the syndiotactic layer being sandwiched between the at least two layers of isotactic polypropylene.

16. The thermoformed polypropylene article of claim 11, wherein the isotactic polypropylene has a meso pentad content of at least 80% as determined by $^{13}$C-NMR spectra.

17. The thermoformed polypropylene article of claim 11, wherein the syndiotactic polypropylene has a racemic pentad content of at least 70% as determined by $^{13}$C-NMR spectra.

18. A method of preparing a polypropylene article comprising providing a layer of substantially syndiotactic polypropylene having a melting point of from about 125° C. to 135° C. and comprising a polypropylene homopolymer or a copolymer of propylene and an olefin monomer of from 2 to 10 carbon atoms; joining at least one layer of substantially isotactic polypropylene comprising a polypropylene homopolymer or a copolymer of propylene and an olefin monomer of from 2 to 10 carbon atoms to the syndiotactic polypropylene layer to form a sheet having a haze at a thickness of 20 mils of from 4.6% to 6.2% and a notched Izod of from greater than 1.1 ft-lb/in. to less than 13.3 ft-lb/in; and thermoforming the joined layers into a desired shape.

19. The method of claim 18, wherein: the layer of syndiotactic polypropylene and the layer of isotactic polypropylene are coextruded.

20. The method of claim 18, further comprising joining a second layer of substantially isotactic polypropylene to the layer of syndiotactic polypropylene with the syndiotactic layer being sandwiched between the layers of isotactic polypropylene.

* * * * *

UNITED STATES PATENT AND TRADEMARK OFFICE
CERTIFICATE OF CORRECTION

PATENT NO. : 7,413,812 B2  
APPLICATION NO. : 11/114377  
DATED : August 19, 2008  
INVENTOR(S) : Lisa Albe et al.

Page 1 of 1

It is certified that error appears in the above-identified patent and that said Letters Patent is hereby corrected as shown below:

Title Page;

"(75) Inventor:    Lisa Albe, Houston, TX (US)"

should read:

--(75) Inventor:    Lisa Albe, Ophain-Bois-Seigneur-Isaac, BE (US), Peter Selg, Ophain-Bois-Seigneur-Isaac, BE (DE), LuAnn Kelly, Friendswood, TX (US)--

Signed and Sealed this  
First Day of November, 2011

David J. Kappos  
*Director of the United States Patent and Trademark Office*